United States Patent
Vadapandeshwara et al.

(10) Patent No.: US 10,042,956 B2
(45) Date of Patent: Aug. 7, 2018

(54) FACILITATING APPLICATION PROCESSES DEFINED USING APPLICATION OBJECTS TO OPERATE BASED ON STRUCTURED AND UNSTRUCTURED DATA STORES

(71) Applicant: Oracle Financial Services Software Limited, Mumbai (IN)

(72) Inventors: Rajaram Narasimha Vadapandeshwara, Bangalore (IN); Tara Nandakishore Kant, Bangalore (IN); Jesna Jacob, Bangalore (IN); Manmay Sethi, Bangalore (IN); Bhargava S, Bangalore (IN); Seema Monteiro, Bangalore (IN); Suresh Singh, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 284 days.

(21) Appl. No.: 14/723,468

(22) Filed: May 28, 2015

(65) Prior Publication Data
US 2016/0335274 A1   Nov. 17, 2016

(30) Foreign Application Priority Data
May 14, 2015   (IN) .......................... 1906/MUM/2015

(51) Int. Cl.
G06F 17/30   (2006.01)
(52) U.S. Cl.
CPC .. *G06F 17/30917* (2013.01); *G06F 17/30569* (2013.01); *G06F 17/30575* (2013.01)

(58) Field of Classification Search
CPC ......... G06F 17/30917; G06F 17/30575; G06F 17/30569
See application file for complete search history.

(56) References Cited

U.S. PATENT DOCUMENTS 8,473,943 B2   6/2013   Dujmovic
8,572,625 B2   10/2013   Huang et al.
(Continued)

OTHER PUBLICATIONS

Mike Ferguson, Architecting a Big Data Platform for Analytics, Intelligent Business Strategies, date Oct. 2012, pp. 1-36.
(Continued)

*Primary Examiner* — Jorge A Casanova
(74) *Attorney, Agent, or Firm* — Iphorizons PLLC; Narendra Reddy Thappeta

(57) ABSTRACT

An aspect of the present disclosure facilitates application process defined using application objects to operate based on structured and unstructured data stores. In one embodiment, a mapping is maintained indicating the data objects defined according to an application data model that are respectively stored in a structured data store and an unstructured data store. Upon receiving an application object (of an application process) specifying an operation based on a data object according to the application data model, the mapping is examined to identify a specific data store storing the data corresponding to the data object. The operation is then translated to a set of instructions consistent with the interface requirements of the identified specific data store. The set of instructions are then executed on the specific data store to cause the operation to be performed based on the data object stored in the specific data store.

20 Claims, 9 Drawing Sheets

(56) References Cited

U.S. PATENT DOCUMENTS

| | | | |
|---|---|---|---|
| 2004/0083199 A1* | 4/2004 | Govindugari | G06F 17/30303 |
| 2005/0289536 A1 | 12/2005 | Nayak et al. | |
| 2005/0289538 A1 | 12/2005 | Black-Ziegelbein et al. | |
| 2006/0167928 A1* | 7/2006 | Chakraborty | G06F 17/2205 |
| 2007/0203893 A1* | 8/2007 | Krinsky | G06F 17/30864 |
| 2013/0268920 A1 | 10/2013 | Ursal et al. | |
| 2014/0019977 A1 | 1/2014 | Kakade et al. | |

OTHER PUBLICATIONS

Simon Evans, Michael Chen, Deploying Content from the Adaptive Application Framework10.1.1 to IBM Cognos Business Intelligence 10.2, IBM Cognos 10 BI, Performance, date Jun. 28, 2013, pp. 1-7.

IBM Cognos BI—Deploy Content Between Environments, IBM Cognos BI, Administration, date Jul. 19, 2011, pp. 1-19.

Multi-Targeting, http://msdn.microsoft.com/en-us/library/ff921092(v=pandp.20).aspx , downloaded circa May 22, 2014, pp. 1-7.

Oracle® Fusion Middleware, Reference Guide for Oracle Business Intelligence Applications, date Apr. 2012, pp. 1-104.

Target environment, http://publib.boulder.ibm.com/infocenter/ratdevz/v7r1m1/index.jsp?topic=/com.ibm.uss.projects.doc/html/concepts/targetenvironmentoverview.html, downloaded circa May 22, 2014, pp. 1-2.

The Big Data Hub, http://www.ibmbigdatahub.com/blog/there%E2c/080%99s-sql-and-then-there%E2%80%99s-sql-hadoop-analytics, downloaded circa May 22, 2014, pp. 1-10.

\* cited by examiner

Details of Hierarchy Basel II Product Type

| | |
|---|---|
| Name | H0006 |
| Short Description | Basel II Product Type |
| Long Descritpiton | Basel II Product Type |
| Comments | |
| Created By | PR2USER |
| Creation Date | December 19, 2006 3:35:19 AM |
| Last Modified By | PR2USER |
| Modification Date | September 14, 2011 3:51:19 AM |
| Authorized By | PR2USER |
| Authorization Date | September 14, 2011 3:51:19 AM |
| Type | REGULAR |
| BI Enabled | Yes |
| Is Parent Child | No |
| Entity | Dimension_Basel_Product_Type ← 440 |
| Attribute | Basel_Product_Type_Code ← 445 |
| Level Details | |

430

Back   Close

FIG. 4B

FACILITATING APPLICATION PROCESSES DEFINED USING APPLICATION OBJECTS TO OPERATE BASED ON STRUCTURED AND UNSTRUCTURED DATA STORES

PRIORITY CLAIM

The instant patent application is related to and claims priority from the co-pending India provisional patent application entitled, "FACILITATING APPLICATION PROCESSES DEFINED USING APPLICATION OBJECTS TO OPERATE BASED ON STRUCTURED AND UNSTRUCTURED DATA STORES", Serial No. 1906/MUM/2015, Filed: 14 May 2015, which is incorporated in its entirety herewith to the extent not inconsistent with the disclosure herein.

BACKGROUND

Technical Field

The present disclosure relates to application servers, and more specifically to facilitating application processes defined using application objects to operate based on structured and unstructured data stores.

Related Art

An application process refers to an ensemble of application objects defined together in a specific order to provide a corresponding functionality. The processing logic of each application object is defined at a high conceptual level (compared to procedural definitions typical in programming languages such as Java, C#), with a supporting framework thereafter being designed to implement the processing logic.

In particular, the application object specifies various high level actions (classify, compute, aggregate, model, etc.) with respect to data objects specified according to an application data model, and the supporting framework operating to generate lower level instructions for implementing the high level actions. The lower level instructions typically include queries according to storage model (e.g., relational model, file, etc.) in which the requisite data forming the data objects are maintained, instructions for invocation of external libraries (for example, to model), etc. It may thus be appreciated that the application data models are at a conceptual level suitable for development of application processes, while the storage models are suitable for (and reflect) the underlying storage technology.

Data stores provide a convenient mechanism for storage and retrieval of data according to corresponding storage models. Storage models, and correspondingly the data stores, can be classified as either structured or unstructured. A structured data store necessarily imposes a schema forcing data to be stored as data records according to corresponding record types (defined in the schema), with every data record having a value corresponding to each field (defined in the schema) for the corresponding record type. Databases (relational or object-based) are illustrative examples of structured data stores.

On the other hand, unstructured data stores do not impose such schemas for storage of data. The data is typically stored in the form of files in a file system. Due to the absence of imposition of a schema, both structured and unstructured data can be stored on unstructured data stores, with the interpretation being left to higher layers, potentially provided closely associated with the unstructured data store. Hadoop Distributed File System (HDFS) available from Apache Software Foundation is an example of an unstructured data store, with Apache Hive available from Apache Software Foundation being the corresponding higher layer for HDFS.

It may be desirable for application processes defined using application objects to operate based on both structured and unstructured data stores at least to make use of the storage capabilities provided by both types of data stores.

BRIEF DESCRIPTION OF THE DRAWINGS

Example embodiments of the present disclosure are described with reference to the accompanying drawings briefly described below.

FIG. 4B illustrates the manner in which the details of a source/target hierarchy are provided in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
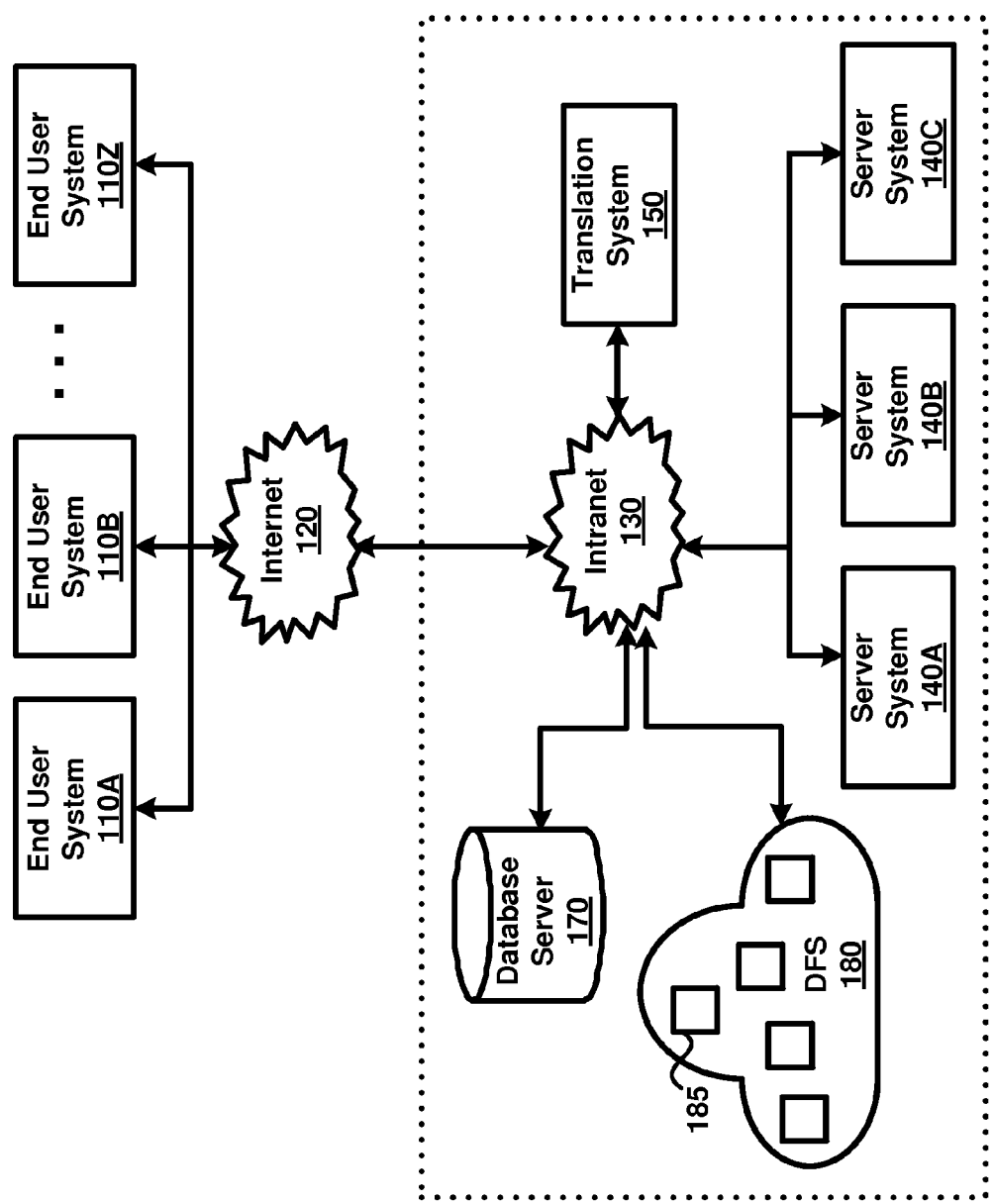
FIG. 1 is a block diagram illustrating an example environment in which several aspects of the present disclosure can be implemented.

An aspect of the present disclosure facilitates application process defined using application objects to operate based on structured and unstructured data stores. In one embodiment, a mapping is maintained indicating the data objects defined according to an application data model that are respectively stored in a structured data store and an unstructured data store. Upon receiving an application object (of an application process) specifying an operation based on a data object according to the application data model, the mapping is examined to identify a specific data store storing the data corresponding to the data object. The operation is then translated to a set of instructions consistent with the interface requirements of the identified specific data store. The set of instructions are then executed on the specific data store to cause the operation to be performed based on the data object stored in the specific data store.

According to another aspect of the present disclosure, when an application object is defined to contain multiple operations including a first operation based on a first data object stored in a structured data store and a second operation based on a second data object stored in an unstructured data store, the first operation is translated to a first set of instructions consistent with interface requirements of the structured data store, while the second operation is translated to a second set of instructions consistent with interface requirements of the unstructured data store. The execution of the first set of instructions and the second set of instructions causes the first operation and the second operation to be performed respectively in the structured and unstructured data stores.

According to one more aspect of the present disclosure, upon receiving a command to move a first data portion representing a first data object (noted above) in one data store (one of a structured data store and a unstructured data store) to the other data store, the first data portion is moved from the one data store to the other data store according to the command. The mapping (noted above) is then modified to generate a new mapping reflecting the move. Accordingly, subsequent application objects are translated based on the modified mapping.

For example, when an application object specifying an operation on a data object is received at a time instance prior to receiving of the above noted (move) command, the data object may be determined to be stored in a structured data store. When another application object specifying the same operation on the same data object is received at a time instance after the mapping is modified, the data object is determined to be stored in the other unstructured data store. Accordingly, the same operation is translated to a set of instructions consistent with interface requirements of the structured data store prior to the move, while the set of instructions are consistent with interface requirements of the unstructured data store after the move.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end user systems 110A-110Z, Internet 120, intranet 130, server systems 140A-140C, translation system 150, database server 170 and distributed file system (DFS) 180.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, translation system 150, database server 170 and DFS 180 all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 130. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Each of end user systems 110A-110Z represents a system such as a personal computer, workstation, mobile station, mobile phones, computing tablets, etc., used by users to generate and send user requests directed to enterprise applications executing in server system 140A-140C. The user requests may be generated using appropriate user interfaces (e.g., web pages provided by an application executing in a server system, a native user interface provided by a portion of the application downloaded from the server system, etc). In general, a user (using one of end user systems 110A-110Z) sends requests for performing desired tasks to an enterprise application and receives corresponding responses containing the results of performance of the requested tasks.

Each of server systems 140A-140C represents a server, such as a web/application server, executing enterprise applications capable of performing tasks requested by users using end user systems 110A-110Z. In response to receiving requests from an end user system, each server system performs the tasks specified in the requests and sends the result of performance of the tasks to the requesting end user system. Each server system may use data stored internally (for example, in a non-volatile storage/hard disk within the server), external data (e.g., maintained in database server 170 or DFS 180) and/or data received from external sources (e.g., from the user) in the performance of the requested tasks.

In one embodiment, each enterprise application is implemented as an application process containing multiple application objects, with a supporting framework thereafter being designed to implement the underlying processing logic of each of the application objects. It should be noted that an application process requires the supporting framework for definition and execution, and accordingly is different from an application, the implementation of which contains machine level instructions (for example, binary, byte code) that can be independently executed in a server system.

Each of database server 170 and distributed file system (DFS) 180 represents a non-volatile (persistent) storage facilitating storage and retrieval of a collection of data by enterprise applications executing in server systems 140A-140C. Database server 170 is implemented using relational database technologies and accordingly provides storage and retrieval of data using structured queries such as SQL (Structured Query Language). As is well known in the relevant arts, SQL refers to a special-purpose, nonprocedural language (generally indicates what to retrieve based on conditions, in contrast to how to retrieve) that supports the definition, manipulation, and control of data in relational database systems.

DFS 180 is implemented as a network of nodes (such as node 185), with each node storing one or more files or portions thereof. In general, the same portion of a file is stored on multiple nodes, thereby facilitating DFS 180 to recover from failures and to handle a large number of access requests. DFS 180 typically uses techniques such as a uniform naming convention for uniquely identifying the files, a mapping scheme to keep track of where (in which node) files are located, and an authorization scheme indicating the applications/users that can access each of the files. It should be noted that from the perspective of an enterprise application (or in general, any external system), DFS 180 operates as a normal file server providing storage and retrieval of data in the form of files organized as one or more directories. HDFS (noted above) is an example of such a distributed file system (DFS) 180.

It may be appreciated that database server 170 represents a structured data store that requires data to be stored according to a (database) schema, while DFS 180 represents a unstructured data store that facilitates both structured and unstructured data to be stored in the form of one or more files. In general, the cost of building and maintaining unstructured data stores is generally less than the cost for structured data stores. However, structured data stores provide additional features such as multi level security, transaction support (commit and rollback), etc., that may be desirable to have for at least some of the data. Enterprises often try to strike a balance between cost and additional services by maintaining the recent/more frequently accessed data in the costly structured stores (such as database server 170), while maintaining the old/less frequently accessed data in cheaper unstructured stores (such as DFS 180). Accordingly, it may be desirable that enterprise applications executing in server systems 140A-140C be facilitated to operate based on both of such structured and unstructured data stores.

Translation system 150, provided according to various aspects of the present disclosure, facilitates application processes (such as enterprise applications executing in server systems 140A-140C) defined using application objects to operate based on structured and unstructured data stores (such as database server 170 and DFS 180), as described below with examples.

Figure 2:
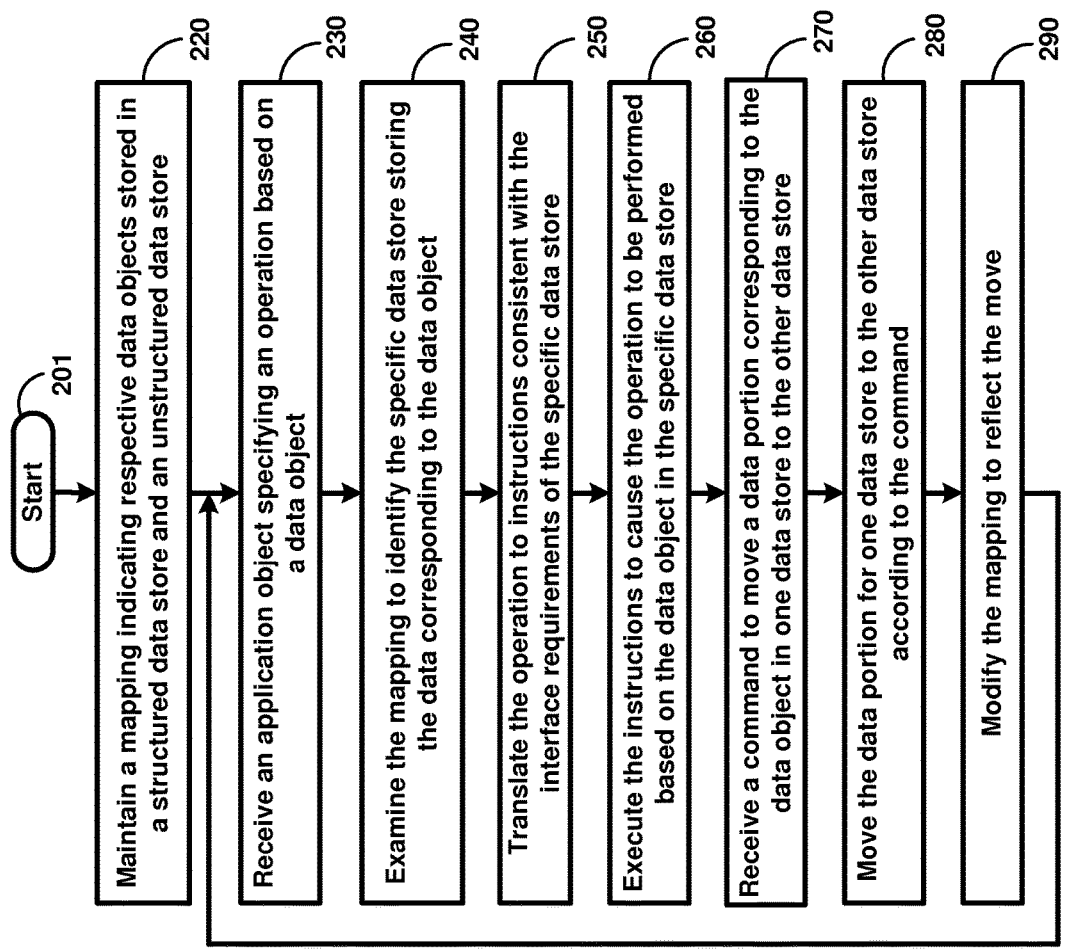
FIG. 2 is a flow chart illustrating the manner in which application process defined using application objects are facilitated to operate based on structured and unstructured data stores according to an aspect of the present disclosure.

3. Facilitating Application Process to Operate Based on Structured/Unstructured Data Stores FIG. 2 is a flow chart illustrating the manner in which application process defined using application objects are facilitated to operate based on structured and unstructured data stores according to an aspect of the present disclosure. The flowchart is described with respect to translation system 150 of FIG. 1 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 220.

In step 220, translation system 150 maintains a mapping indicating respective data objects (defined according to an application data model) stored in a structured data store (such as database server 170) and an unstructured data store (such as DFS 180). It will be appreciated from the description below that the application data model can be independent of how and where the overall data of interest is distributed among structured and unstructured data stores.

In step 230, translation system 150 receives an application object specifying an operation based on a data object (defined according to the application data model). The application object specifies a high level action containing one or more operations such as change/update, deletion of the data object, etc., specified in accordance with the application data model. The application object may be received in response to executing an application process/enterprise application in server systems 140A-140C.

In step 240, translation system 150 examines the mapping to identify the specific data store storing the data corresponding to the data object. As described below, aspects of the present disclosure provide for moving of data portions from one data store to the other, and accordingly the mapping is examined while processing each application object that performs operations on data objects defined according to the application data model.

In step 250, translation system 150 translates the operation to instructions consistent with the interface requirements of the specific data store (identified in step 240). In one embodiment, noted below, the instructions are in the form of queries consistent with the interfaces exposed by the specified data store. The queries are directed to performing the specified operation on the data portions representing the data object in the specific data store.

In step 260, translation system 150 executes the instructions to cause the operation to be performed based on the data object in the specific data store. In the embodiment noted above, the queries are sent to the specific data store for execution, with the specific data store then executing the queries (on the corresponding data portions) and providing the results of the queries to translation system 150. Translation system 150 may convert the received results to corresponding data objects according to the application data model and provide the data object as a response to execution of the operation. The response specified according to the application data model facilitates an application process (an enterprise application executing in server systems 140A-140C) to specify additional operations/application objects based on the application data model.

In step 270, translation system 150 receives a command to move a data portion corresponding to the data object in one data store ("source data store") to the other data store ("target data store"). Thus, the move may be requested from database server 170 to DFS 180 or vice versa. The command can be received according to any pre-specified format/convention. It should be appreciated that the set of steps 230-260 could be performed many times (to process corresponding number of application objects) before the command is received in step 270.

In step 280, translation system 150 moves the data from the source data store to the target data store, according to the command of step 270. The moving may entail issuing queries to retrieve the data portion from the source data store, issuing further queries to store the retrieved data in the target data store, and possibly deleting the data portion in the source data store. Any necessary/user specified data transformation may be performed prior to the storing.

In step 290, translation system 150 modifies the mapping to reflect the move, and control thereafter passes to step 230 described above. As a result, subsequent application objects are processed according to the modified mapping. Thus, prior to the move, an application object specifying an operation on a data object causes translation into queries directed to the source data store, while after the move, the queries are directed to the target data store for the same operation on the same data object.

Thus, an administrator of an enterprise may dynamically determine where to store corresponding data objects/data portions based on considerations such as cost, security, etc., as noted above, and move the data portions to the stores accordingly. However, the application processes (enterprise applications executing in server systems 140A-140C) can continue to operate without requiring any change to the application objects constituting each application process.

The features described above can be implemented in various embodiments. The description is continued with respect to an example implementation for facilitating applications defined using application objects to operate based on both structured and unstructured data stores in a corresponding environment.

4. Example Implementation

Figure 3:
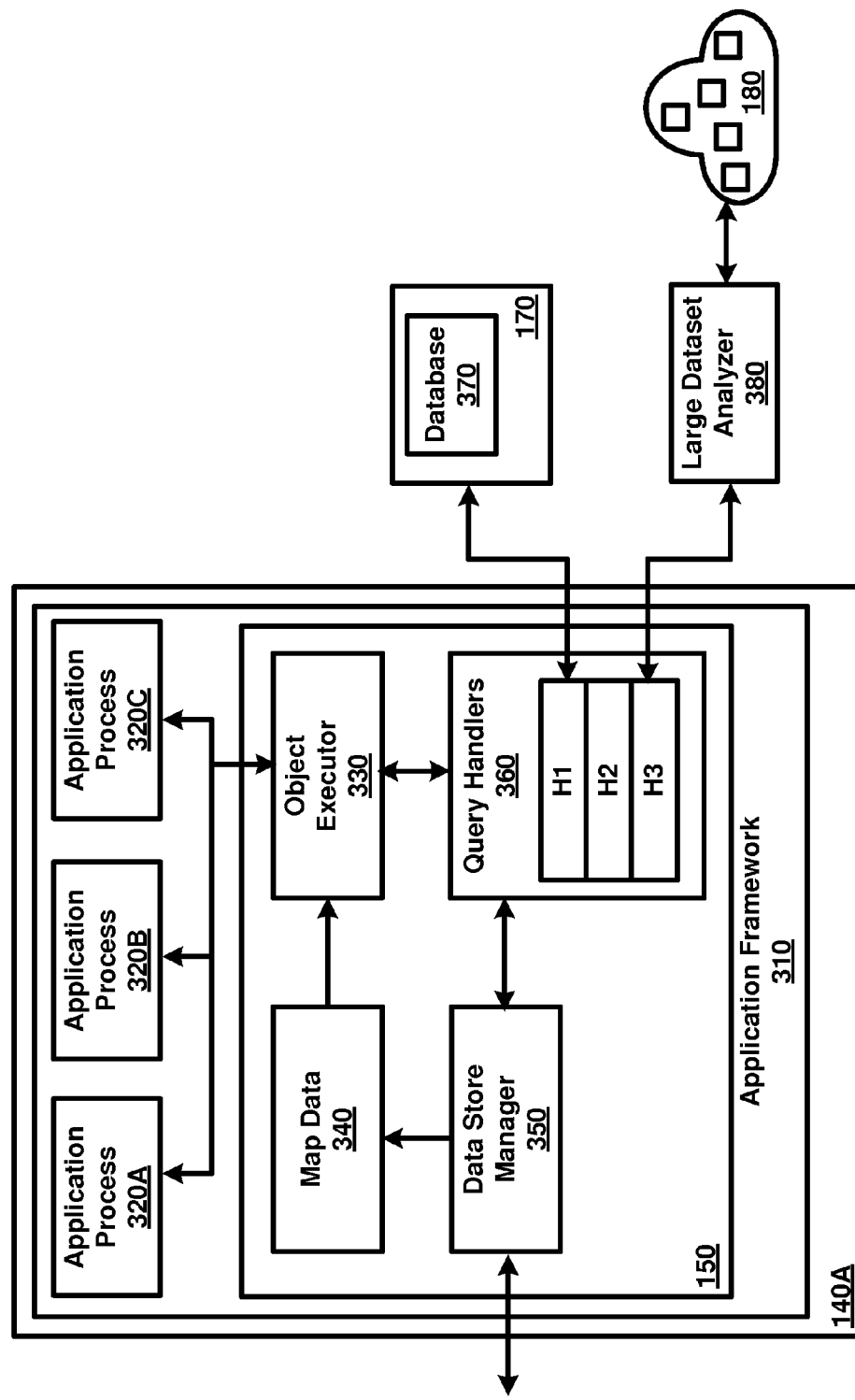
FIG. 3 is a block diagram illustrating the manner in which applications are facilitated to operate based on structured and unstructured data stores in one embodiment.

FIG. 3 is a block diagram illustrating the manner in which applications are facilitated to operate based on structured and unstructured data stores in one embodiment. The block diagram is shown containing application framework 310 (executing in server system 140A, for illustration), database 370 (in database server 170) and large dataset analyzer (LDA) 380 (executing as a front end to DFS 180).

As may be readily observed, translation system 150 is shown implemented as a part of application framework 310. Translation system 150 is shown containing object executor 330, map data 340, data store manager 350, and query handlers 360. Application framework 310 is also shown containing application processes 320A-320C. Each of the blocks is described in detail below.

Application framework 310 represents a software that simplifies the process of development and execution of applications/programming logics by developers/users. Application framework 310 generally provides various pre-developed modules/libraries, programming/user interface templates, etc., in the form of application objects that can be readily incorporated into a new application process. In addition, application framework 310 may provide a graphical user interface (commonly referred to as an integrated development environment) to assist the developer during the development of a new application process. An example of an application framework is Oracle Financial Services Analytical Applications (OFSAA) available from Oracle Corporation, the intended assignee of the instant application.

Each of application processes 320A-320C represents a corresponding application/programming logic executing in the context of application framework 310. Each application process contains one or more application objects that are understood and correspondingly executed by application framework 310. As noted above, each of application processes 320A-320C may correspond to an enterprise application, noted above, capable of processing user requests received from users using end user systems 110A-110Z. It may be appreciated that for processing some of the user requests, application processes 320A-320C (in particular, application objects contained in the application process) may require operations to be performed on external data/information (for example, stored in database server 170 or DFS 180).

In one embodiment, the data maintained in database server 170/DFS 180 is modeled (and accordingly accessed by applications) as data objects, attributes and object instances. As is well known, a data object contains various attributes, with an instance ("object instance") of the data object having corresponding values for respective attributes. When stored in a database (such as 370), a data object may correspond to one or more tables, with each attribute corresponding to a respective column of such table(s) and each object instance corresponding to a row in such table(s). When stored in a file server (such as 180), each data object may correspond to one or more files, with each object instance represented by a set of lines in the file(s), each line in turn specifying an attribute and corresponding value.

It may be appreciated that the data objects, attributes and object instances together constitute an application data model provided by application framework 310 to application processes 320A-320C. Such an application data model facilitates application processes/objects to be developed and executed agnostic to the structure/format (database vs file system) of the underlying data.

The manner in which application processes (310A-310C) may be defined using application objects is described below with examples.

5. Defining Application Process

As noted in the Background section, each application process is an ensemble of application objects that are to be executed according to a specific order to provide a corresponding functionality. Examples of application objects are classification rules, data management rules, deterministic computation rules, stochastic models, analytical query objects, aggregation rules, etc.

Rules are commonly used for updating one or more data objects. Rules are at a conceptual level, which are understandable to users (e.g., managers), who may not be conversant with corresponding implementations closer to the level (e.g., programming language, SQL queries, etc.) at which machines are able to operate. Updating a data object implies a change to corresponding values of one or more attributes of respective object instances of the data object. As a simple case, a bank may have a rule that updates an interest rate depending on different levels of credit ratings of the customer (high risk, medium risk and low risk) and the type of the loan (e.g., home, car, personal, etc.). The manner in which an application object (rule) may be specified is described in detail below.

Figure 4A:
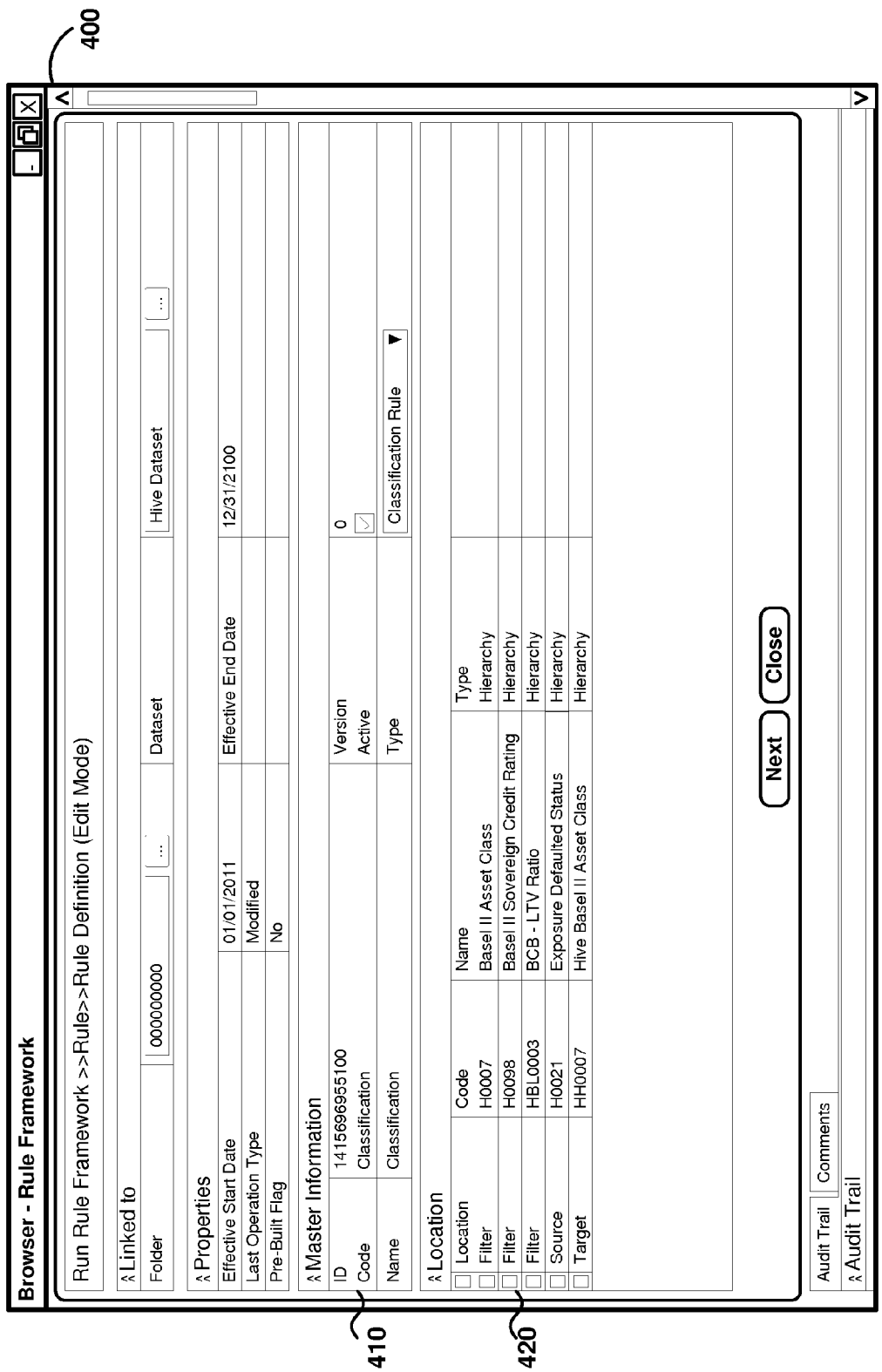
FIG. 4A depicts the manner in which an application object (rule) is specified in one embodiment.

FIG. 4A depicts the manner in which an application object (rule) is specified in one embodiment. Display area 400 (and also 430 of FIG. 4B, 460 of FIG. 4C and 500 of FIGS. 5A-5B) depicts a respective portion of a user interface provided on a display unit (not shown in FIG. 1) associated with one of end user systems 110A-110Z. In one embodiment, each display area corresponds to a browser displaying respective web pages provided by server system 140A (in particular, application framework 310). The web pages are provided in response to a user/administrator of the enterprise sending appropriate requests using the browser in the requesting end user system.

Display area 410 indicates that a new rule named "Classification" is sought to be created and the type of the rule is classification. Display area 440 displays the various hierarchies such as "Basel II Asset Class", "Basel II Sovereign Credit Rating", etc. selected by the user. Each hierarchy represents a corresponding set of potential values of interest that can be assigned to an attribute, with the set of potential values organized in the form of a tree data structure, well known in the arts. A classification rule specifies the specific value to be assigned from a target hierarchy for the corresponding combination of values present in the source hierarchy (with filters assisting a user/administrator to simplify specification of the combinations). Display area 440 indicates that "Exposure Defaulted Status" is the source hierarchy and that "Hive Basel II Asset Class" is the target hierarchy, while three other hierarchies are specified as filters (in the "Location" column).

FIG. 4B illustrates the manner in which the details of a source/target hierarchy are provided in one embodiment. Display area 430 depicts the details of a hierarchy named "Basel II Product Type". In particular, display areas 440 and 445 respectively indicate the name of the entity/table ("Dimension_Basel_Product_Type") and the name of the attribute/column ("Basel_Product_Type_Code") in the underlying data store storing the values of the hierarchy. Though not shown as displayed, it may be appreciated that the mapping (maintained by translation system 150) may also indicate the specific data store in which the entity/attribute is stored. Display area 430 may be provided as a pop-up window (overlaying display area 400), in response to the administrator selecting a source/target hierarchy in display area 420.

Thus, a user is enabled to specify an application object (classification rule) for updating data objects. It may be appreciated that the classification rule of FIG. 4A specifies multiple operations on different data objects (that may be potentially stored in different data stores) such as a retrieve operation for retrieving the assigned values of the source hierarchy in one or more data objects and an update operation for updating the values for the target hierarchy in the one or more data objects. The user may similarly specify various other application objects and then assemble the specified application objects into desired application processes as described below with examples.

Figure 4C:
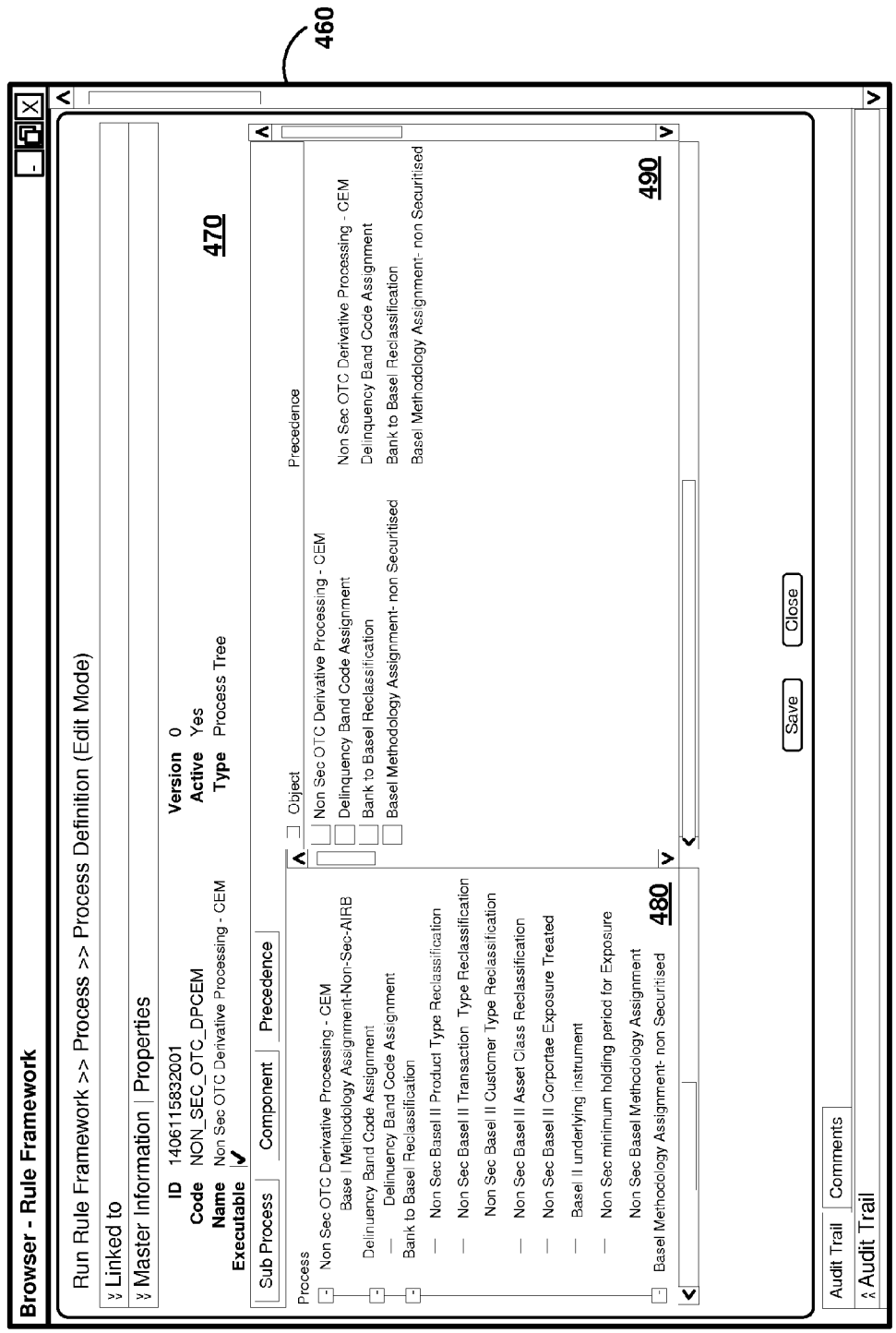
FIG. 4C illustrates the manner in which an application process is defined using application objects in one embodiment.

FIG. 4C illustrates the manner in which an application process is defined using application objects in one embodiment. Display area 470 provides the details such as the name, type, version, etc. of the application process (definition). Display area 480 depicts the hierarchy of the application objects specified as part of the application process. The hierarchy indicates which of the application objects are to be executed as sub-processes (of the main/application process). Display area 490 specifies the details of each of the application objects such as a unique identifier of each application object (same as in display area 480), the precedence of the application object (indicating which prior application objects are required to be executed before execution of the corresponding object) and the type of the object (not shown).

It should be appreciated that the hierarchy and precedence specified by a user/administrator enforces an execution order in which the application objects are to be executed. More details on how a rule (application process) is specified and thereafter executed is available in U.S. Pat. No. 8,856,126, entitled "SIMPLIFYING GROUPING OF DATA ITEMS STORED IN A DATABASE". The manner in which application objects constituting an application process is executed is described below with examples.

6. Executing Application Objects

Referring again to FIG. 3, object executor 330 receives an application object specified in one of application processes 320A-320C, with the application object specifying an operation on a corresponding data object. For example, object executor 330 may receive the classification rule specified in FIG. 4A indicating a retrieve operation to be performed on the source hierarchy data object. Object executor 330 then identifies the specific data store storing the data object on which the specified operation is to be performed. The identification of the specific data store is performed by examining map data 340.

Map data 340 specifies a mapping indicating the data objects stored in corresponding data stores. In general, map data 340 indicates for each data object in the application data model, the corresponding data store (for example, the name "HiveSrc1" in display area 510, described in below sections) and the table (e.g. "Dimension_Basel_Product_Type" shown in display area 440) or file in which the data portion representing the data object is stored. Map data 340 may also indicate for each of the attributes (of a data object), the corresponding column (e.g. "Basel_Product_Type_Code" shown in display area 445) in which the value of the attribute is stored. Map data 340 may be maintained in any convenient form such as a table (having rows and columns) in a database, as Extensible Markup Language (XML) and/or using other data structures such as trees, lists, etc. as suitable for the environment, as will be apparent to one skilled in the relevant arts by reading the disclosure herein.

After identifying the specific data store, object executor 330 then forwards the received application object (along with the identified data store) to query handlers 360. Query handlers 360 represents a set of handlers (indicated as H1-H3 for illustration), with each handler designed to translate the received application object to instructions (in one embodiment, queries) consistent with the interfaces provided by a corresponding type of data store. For example, handler H1 forms instructions/queries consistent with the interface provided by database server 170, while handler H3 forms instructions/queries consistent with the interface provided by LDA 380. Query handlers 360 may be implemented using plug-in architectures well known in the relevant arts. The instructions/queries are formed for performing the operations (such as insert, update, delete, retrieve, etc.) specified in the received application object.

In one embodiment, as noted above, database server 170 is implemented using relational database technologies and accordingly provides storage and retrieval of data from database 370 using structured queries such as SQL (Structured Query Language). The data is stored in database 370 in the form of one or more tables containing corresponding rows and columns, as is well known in the relevant arts.

Large Dataset Analyzer (LDA) 380 facilitates and managing large datasets residing in distributed storage such as DFS 180. In particular, LDA 380 provides a mechanism to project a structure onto the data stored in the various files and also provides a high level programming language to perform various operations such as data summarization, querying, and analysis based on the projected structure. Apache Hive available from Apache Software Foundation is an example of such a large dataset analyzer, which provides a SQL-like language called HiveQL for performing querying and analysis of the data.

Accordingly, handler H1 (of query handlers 360) is designed to generate and issues instructions/queries according to SQL, while handler H3 is designed to generate and issue instructions/queries according to HiveQL. For executing the classification rule shown in FIG. 4A, Appendix A depicts the SQL queries generated and issued if the corresponding data objects are stored (and correspondingly identified by object executor 330) in database 370, while Appendix B depicts the HiveQL queries generated and issued (to LDA 380) if the corresponding data objects are stored in DFS 180.

Though not shown, it may be appreciated that an application object (such as the classification rule of FIG. 4A) may specify a two different operations (such as the retrieve and update operations) based on data objects that are stored in different data stores. For example, the source hierarchy of a rule may be stored in database 370, while the target hierarchy of the same rule may be stored in DFS 180. In such a scenario, multiple handlers may be executed to translate the operations into corresponding different sets instructions, which may then be executed on the specific data store.

Upon execution of the queries (by database server 170 or LDS 380), corresponding query results containing the results of performance of the data access operations specified in the queries are generated. The query results are sent (by database server 170 or LDS 380) as corresponding responses to the queries to query handler 360, which in turn forwards the query results to object executor 330. Object executor 330 then forms data objects corresponding to the query results and based on the application data model. Object executor 330 may also examine map data 340 to facilitate such conversion of the query results to the corresponding data objects and attributes. Object executor 330 then sends the response to application processes 320A-320C containing the received application object.

Thus, translation system 150 translates and executes application objects contained in different application processes (320A-320C). While executing, an administrator of the enterprise may determine that a data portion (representing a data object) that is currently stored in one data store (e.g. database 370) is required to be moved to the other data store (e.g. DFS 180). The manner in which an administrator is facilitated to move data from one data store to another is described below with examples.

7. Moving Data from One Data Store to the Other Data Store

Referring again to FIG. 3, data store manager 350 facilitates administrators/users to move desired data portions between structured and unstructured data stores. To initiate the move, an administrator sends a command specifying the details such as the data portions, the source data store, the target data store, any desired transformations, etc. of the move. The manner in which the administrator may send such a command is described below with examples.

Figure 5A:
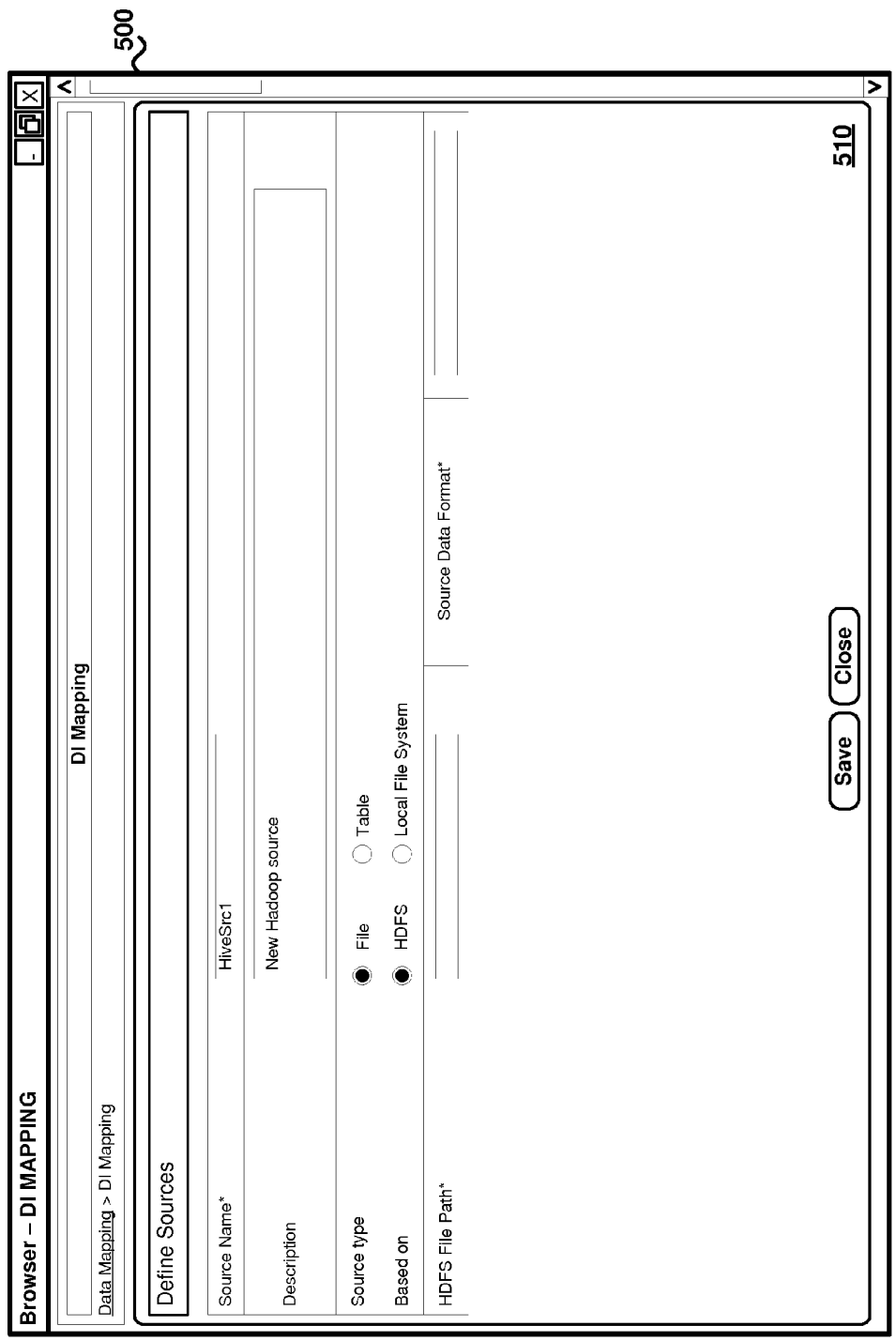
FIG. 5A-5B together depicts the manner in which a command to move a desired data portion (representing a data object) from one data store to another data store is received (from an administrator) in one embodiment.
Figure 5B:
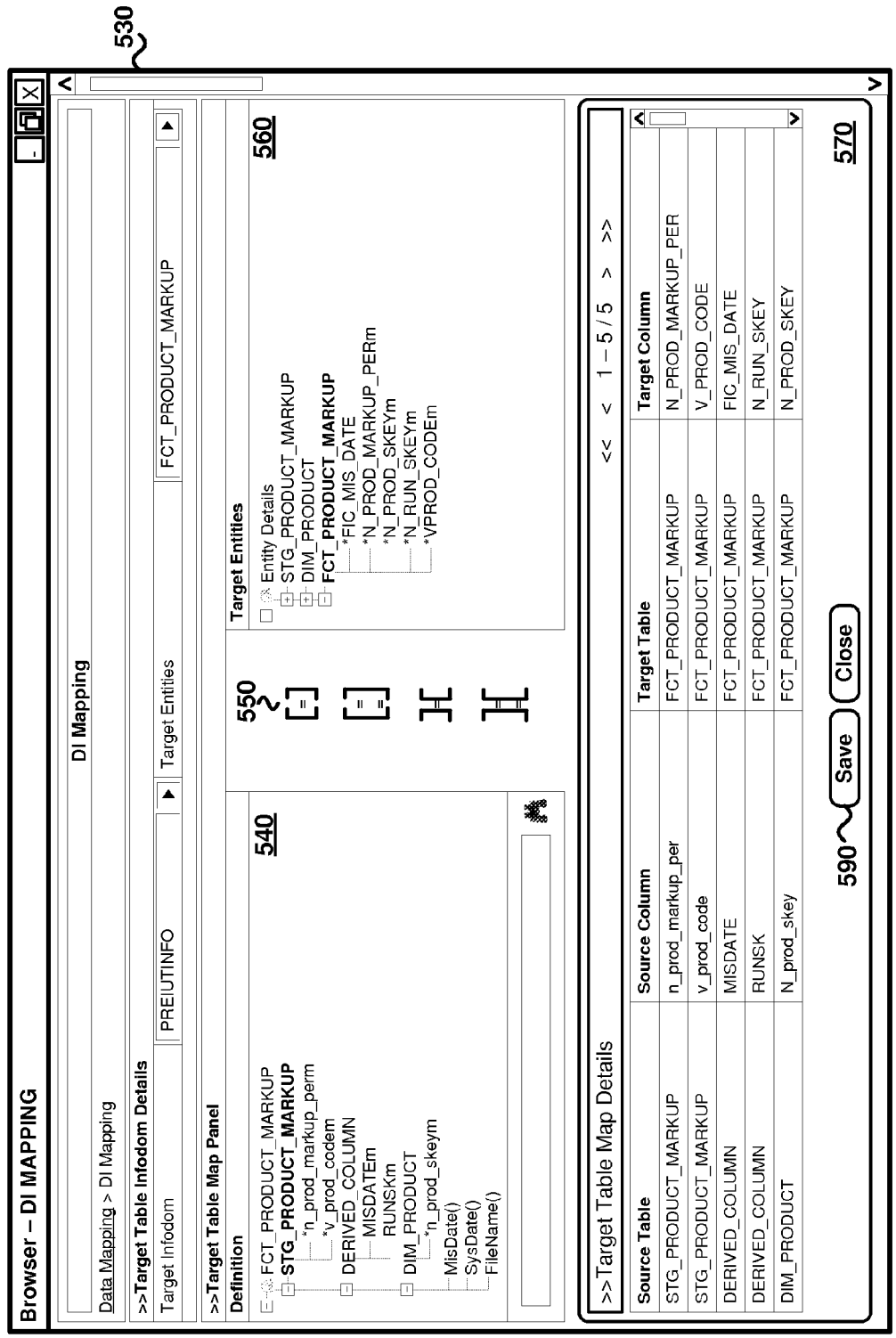

FIG. 5A-5B together depicts the manner in which a command to move a desired data portion (representing a data object) from one data store to another data store is received (from an administrator) in one embodiment. As noted above, each of display areas 500 and 530 depicts a corresponding portion of a user interface provided associated with one of end user systems 110A-110Z.

Referring to FIG. 5A, display area 510 facilitates an administrator to add the various types of data stores in which data objects can be stored. In particular, the administrator is shown adding a data store/source named "HiveSrc1" which is of type "File" and in particular "HDFS" (as indicated by the selected radio buttons). The administrator may similarly add other data stores storing data corresponding to data objects defined according to an application data model.

Referring to FIG. 5B, display areas 540 and 550 displays the details of data stores/sources specified/added by an administrator (using the interface of FIG. 5A). The details of the data stores are shown in the form of a hierarchy with the data stores as top level nodes, tables as child nodes to the top level nodes, and columns as child nodes of the table nodes.

The user may select a desired source table and source column in display area 540, a desired target table and target column in display area 560 and then click on button 550 to indicate that the data stored in source column of the source table is to be moved to the target column of the target table. In response to clicking on button 550, the association between the source table/column and target table/column is shown as a corresponding row in display area 570.

Display area 570 accordingly specifies the various source tables and source columns from which corresponding data is to be moved to the associated target tables and target columns. The user/administrator after specifying the desired associations, may click on "Save" button 590 to issue a command to move data based on the associations. The command indicates the source data store, source tables, source columns, the target data store, target tables, target column, and any other data transformations that are required to be performed as part of the move.

Referring again to FIG. 3, data store manager 350, in response to receiving a command to move (when the user clicks/selects "Save" button 590 in FIG. 5B), first interacts with query handlers 360 to cause the specified (source tables/columns) data portions to be moved from the source data store to the target data store. For example, assuming that the source data store is database 370 and the target data store is LDA 380, handler H1 first issues various queries to retrieve the specified data portions from database 370, and handler H3 thereafter issues further queries to store the retrieved data in DFS 180. Appendix C depicts the various queries that may be issued to move data between different combinations of SQL-type structured data stores (such as database server 170) and HiveQL-type unstructured data stores (such as LDA 380 and DFS 180) in response to the move command shown in FIG. 5B.

Though not shown, post confirmation of the storage of the data portions in the target data store, query handlers 360 may issue additional queries to cause deletion of the moved/specified data portion in the source data store. For example, handler H1 may issue (post confirmation of storage of the first data portion in DFS 180) additional queries to database 370 to cause deletion of the first data portion in the database 370.

Data store manager 350 may thereafter modify map data 340 to reflect the move. For example, assuming that map data 340 indicates that a specific data object and attribute is stored as table "STG_PRODUCT_MARKUP" and column "n_prod_code" in the source data store prior to moving the data (receiving the command), the map data is modified to indicate that the same specific data object and attribute is stored in table "FCT_PRODUCT_MARKUP" and column "V_PROD_CODE" in the target data store post the move. Thus, the same operation performed on the specific data object is translated to instructions directed to the source data store prior to the move, and to instructions directed to the target store after the move.

Thus, an administrator of an enterprise is facilitated to dynamically determine where to store corresponding data portions based on considerations such as cost, security, etc., as noted above, and cause the data portions to be moved accordingly. Application processes 320A-320C can continue to operate without requiring any change to the code constituting the application objects.

It should be further appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

Figure 6:
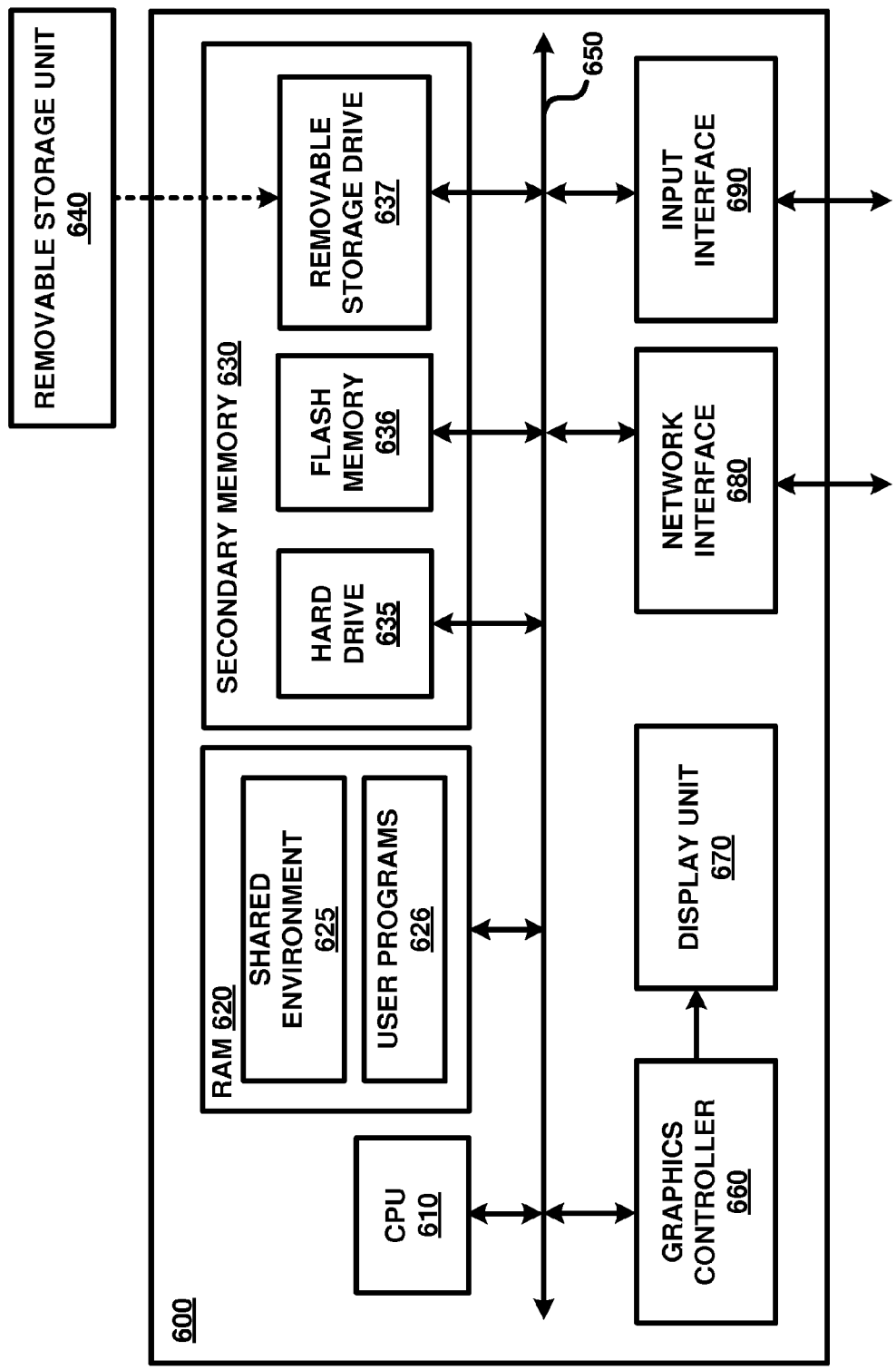
FIG. 6 is a block diagram illustrating the details of a digital processing system in which several aspects of the present disclosure are operative by execution of appropriate software instructions.

FIG. 6 is a block diagram illustrating the details of digital processing system 600 in which several aspects of the present disclosure are operative by execution of appropriate software instructions. Digital processing system 600 corresponds to any system (such as server systems 140A-140C) implementing translation system 150.

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

RAM 620 is shown currently containing software instructions constituting shared environment 625 and/or user programs 626 (such as database applications, application framework, etc.). Shared environment 625 contains utilities shared by user programs, and such shared utilities include operating system, device drivers, virtual machines, flow engines, etc., which provide a (common) run time environment for execution of user programs 626.

Graphics controller 660 generates display signals (e.g., in RGB format) to display unit 670 based on data/instructions received from CPU 610. Display unit 670 contains a display screen to display the images defined by the display signals (such as the portions of the user interfaces of FIGS. 4A-4C and 5A-5B). Input interface 690 may correspond to a keyboard and a pointing device (e.g., touch-pad, mouse) that may be used to provide various inputs (such as to specify the desired inputs, etc. in the user interfaces of FIGS. 4A-4C and 5A-5B). Network interface 680 provides connectivity to a network (e.g., using Internet Protocol), and may be used to communicate with other connected systems of FIG. 1.

Secondary memory 630 may contain hard drive 635, flash memory 636, and removable storage drive 637. Secondary memory 630 represents a non-transitory medium, which may store the data (for example, portions of map data, queries shown in Appendix A-C) and software instructions (for example, for performing the steps of FIG. 2), to enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Secondary memory 630 may contain hard drive 635, flash memory 636, and removable storage drive 637. Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

SQL QUERIES FOR CLASSIFICATION RULE

```
MERGE INTO FCT_NON_SEC_EXPOSURES TT
USING (SELECT *
    FROM (SELECT FCT_NON_SEC_EXPOSURES.n_acct_skey,
            FCT_NON_SEC_EXPOSURES.n_run_skey,
            FCT_NON_SEC_EXPOSURES.n_gaap_skey,
            FCT_NON_SEC_EXPOSURES.n_mis_date_skey,
            (FCT_NON_SEC_EXPOSURES.N_BASEL_ASSET_CLASS_SKEY)                AS
T_1415696955100_0,
            CASE
                WHEN ((((COALESCE(FCT_NON_SEC_EXPOSURES.f_exp_defaulted_flag,
                    'N') ='Y'))) OR (((1 =1)))) THEN
                    10
                ELSE
                    11
            END AS COND_1415696955100_10,
            (89.0) AS EXP_1415696955100_10,
            (FCT_NON_SEC_EXPOSURES.N_BASEL_ASSET_CLASS_SKEY)                AS
EXP_1415696955100_11
        FROM FCT_NON_SEC_EXPOSURES
        LEFT    OUTER    JOIN    DIM_BASEL_ASSET_CLASS                      ON
DIM_BASEL_ASSET_CLASS.n_basel_asset_class_skey =
                        FCT_NON_SEC_EXPOSURES.n_basel_asset_class_skey
        LEFT    OUTER    JOIN    DIM_COUNTRY                                ON
FCT_NON_SEC_EXPOSURES.n_country_skey =
                        DIM_COUNTRY.n_country_skey
        WHERE (1 =1)
            AND (FCT_NON_SEC_EXPOSURES.n_mis_date_skey ='$MDSK' AND
                fct_non_sec_exposures.n_run_skey ='$RUNSK')
            AND (((1 =1)) AND (((1 =1))) AND (((1 =1)))))
    WHERE ((COND_1415696955100_10 <>11))) SS
ON (TT.n_acct_skey =SS.n_acct_skey AND TT.n_run_skey = SS.n_run_skey          AND
TT.n_gaap_skey =SS.n_gaap_skey AND TT.n_mis_date_skey =SS.n_mis_date_skey)
WHEN MATCHED THEN
    UPDATE SET TT.N_BASEL_ASSET_CLASS_SKEY = CASE
WHEN COND_1415696955100_10  =  10   THEN   EXP_1415696955100_10             ELSE
EXP_1415696955100_11 END
```

APPENDIX B

HIVEQL QUERIES FOR CLASSIFICATION RULE

```
INSERT INTO TABLE FCT_PR_1418367604156
    SELECT FCT_NON_SEC_EXPOSURES.N_ACCT_SKEY,
            FCT_NON_SEC_EXPOSURES.N_RUN_SKEY,
            FCT_NON_SEC_EXPOSURES.N_GAAP_SKEY,
            FCT_NON_SEC_EXPOSURES.N_MIS_DATE_SKEY,
            FCT_NON_SEC_EXPOSURES.N_BASEL_ASSET_CLASS_SKEY,
            FCT_NON_SEC_EXPOSURES.N_COUNTRY_SKEY,
            (CASE
                WHEN COND_1415697566978_10 =10 THEN
                    EXP_1415697566978_10
                ELSE
                    EXP_1415697566978_11
            END) AS N_EAD_PRE_MITIGATION,
            FCT_NON_SEC_EXPOSURES.V_CCY_CODE,
            FCT_NON_SEC_EXPOSURES.N_PRE_MITIGATION_RW_UL,
            FCT_NON_SEC_EXPOSURES.N_EXPOSURE_AMOUNT,
            FCT_NON_SEC_EXPOSURES.N_EXP_DED_AMT,
            FCT_NON_SEC_EXPOSURES.N_CCF_PERCENT_DRAWN,
            FCT_NON_SEC_EXPOSURES.N_UNDRAWN_AMOUNT,
            FCT_NON_SEC_EXPOSURES.N_CCF_PERCENT,
            FCT_NON_SEC_EXPOSURES.F_EXP_DEFAULTED_FLAG,
            FCT_NON_SEC_EXPOSURES.F_GUAR_BY_SOVERIGN_IND,
            FCT_NON_SEC_EXPOSURES.PT_MIS_DATE_SKEY,
            FCT_NON_SEC_EXPOSURES.PT_RUN_SKEY
```

APPENDIX B-continued

HIVEQL QUERIES FOR CLASSIFICATION RULE

```
        FROM (SELECT FCT_NON_SEC_EXPOSURES.*,
                (FCT_NON_SEC_EXPOSURES.N_EAD_PRE_MITIGATION)                AS
T_1415697566978_0,
                (CASE
                    WHEN (((((COALESCE(FCT_NON_SEC_EXPOSURES.f_exp_defaulted_flag,
                            'N') ='Y')))) THEN
                        10
                    ELSE
                        11
                END) AS COND_1415697566978_10,
                ((COALESCE(CASE
                            WHEN 1 =1 THEN
                                FCT_NON_SEC_EXPOSURES. n_exposure_amount
                            ELSE
                                NULL
                        END,
                    0) - COALESCE(CASE
                            WHEN 1 =1 THEN
                                FCT_NON_SEC_EXPOSURES.n_exp_ded_amt
                            ELSE
                                NULL
                        END,
                        0)) *
                COALESCE(CASE
                            WHEN 1 =1 THEN
                                FCT_NON_SEC_EXPOSURES.n_ccf_percent_drawn
                            ELSE
                                NULL
                        END,
                    1) +
                COALESCE(CASE
                            WHEN 1 =1 THEN
                                FCT_NON_SEC_EXPOSURES.n_undrawn_amount
                            ELSE
                                NULL
                        END,
                    0) * COALESCE(CASE
                                WHEN 1 =1 THEN
                                    FCT_NON_SEC_EXPOSURES.n_ccf_percent
                                ELSE
                                    NULL
                            END,
                        1)) AS EXP_1415697566978_10,
                (FCT_NON_SEC_EXPOSURES.N_EAD_PRE_MITIGATION)                AS
EXP_1415697566978_11
            FROM FCT_NON_SEC_EXPOSURES
                LEFT   OUTER   JOIN   DIM_BASEL_ASSET_CLASS                ON
DIM_BASEL_ASSET_CLASS.N_BASEL_ASSET_CLASS_SKEY =
FCT_NON_SEC_EXPOSURES.N_BASEL_ASSET_CLASS_SKEY
                LEFT   OUTER   JOIN   DIM_COUNTRY                          ON
FCT_NON_SEC_EXPOSURES.N_COUNTRY_SKEY =
                            DIM_COUNTRY.N_COUNTRY_SKEY
            WHERE (1 =1)
                AND FCT_NON_SEC_EXPOSURES.n_mis_date_skey ='$MDSK'
                AND fct_non_sec_exposures.n_run_skey ='$RUNSK'
                AND PT_MIS_DATE_SKEY = $MDSK
                AND PT_RUN_SKEY = $RUNSK) FCT_NON_SEC_EXPOSURES
***************************************************************************
INSERT OVERWRITE TABLE FCT_NON_SEC_EXPOSURES PARTITION
    (PT_MIS_DATE_SKEY =$MDSK, PT_RUN_SKEY =$RUNSK)
    SELECT N_ACCT_SKEY,
            N_RUN_SKEY,
            N_GAAP_SKEY,
            N_MIS_DATE_SKEY,
            N_BASEL_ASSET_CLASS_S KEY,
            N_COUNTRY_SKEY,
            N_EAD_PRE_MITIGATION,
            V_CCY_CODE,
            N_PRE_MITIGATION_RW_UL,
            N_EXPOSURE_AMOUNT,
            N_EXP_DED_AMT,
            N_CCF_PERCENT_DRAWN,
            N_UNDRAWN_AMOUNT,
            N_CCF_PERCENT,
            F_EXP_DEFAULTED_FLAG,
            F_GUAR_BY_SOVERIGN_IND
```

APPENDIX B-continued

HIVEQL QUERIES FOR CLASSIFICATION RULE

```
FROM FCT_PR_1418367604156 FCT_PR_1418367604156
WHERE PT_MIS_DATE_SKEY =$MDSK
    AND PT_RUN_SKEY =$RUNSK
```

APPENDIX C

```
1. Load Data from RDBMS Based Source into RDBMS Based Target (T2T)
Select STG_PRODUCT_MARKUP.n_prod_markup_per,
    STG_PRODUCT_MARKUP.v_prod_code,
    '31-01-2015, 1,
    DIM_PRODUCT.n_prod_skey
FROM STG_PRODUCT_MARKUP
    INNER JOIN DIM_PRODUCT
    ON STG_PRODUCT_MARKUP.v_prod_code =DIM_PRODUCT.v_prod_code
    AND DIM_PRODUCT.f_latest_record_indicator ='Y'
WHERE 1 =1
Insert into FCTPRODUCTMARKUP
    (n_prod_markup_per, v_prod_code, fic_mis_date, n_run_skey, n_prod_skey)
values
    (?, ?, to_date(?, 'mm-dd-yyyy'), ?,?)
2. Load Data from Hive Based Source into RDBMS Based Target (H2T)
Select STG_PRODUCT_MARKUP.n_prod_markup_per,
    STG_PRODUCT_MARKUP.v_prod_code,
    '2015-01-31 00:00:00',
    1,
    DIM_PRODUCT.n_prod_skey
from ut801fs.STG_PRODUCT_MARKUP
    INNER JOIN ut8Olfs.DIM_PRODUCT
    ON STG_PRODUCT_MARKUP.v_prod_code =DIM_PRODUCT.v_prod_code
    AND DIM_PRODUCT.f_latest_record_indicator ='Y'
Insert into FCT_PRODUCT_MARKUP
    (n_prod_markup_per, v_prod_code, fic_mis_date, n_run_skey, n_prod_skey)
values
    (?, ?, to_timestamp(?, 'yyyy-mm-dd HH24:MI:SS.FF'), ?, ?)
3. Load Data from Hive Based Source into Hive Based Target (H2H)
Insert into table FCT_PRODUCT_MARKUP
    Select '2015-01-31 00:00:00',
        DIM_PRODUCT.n_prod_skey,
        STG_PRODUCT_MARKUP.v_prod_code,
        STG_PRODUCT_MARKUP.n_prod_markup_per,
        1
    from ut801fs.STG_PRODUCT_MARKUP
        INNER JOIN ut801fs.DIM_PRODUCT
        ON STG_PRODUCT_MARKUP.v_prod_code =DIM_PRODUCT.v_prod_code
        AND DIM_PRODUCT.f_latest_record_indicator ='Y'
4. Load Data from RDBMS Based Source into Hive Based Target (T2H)
Select 2015-01-31,
    DIM_PRODUCT.N_PROD_SKEY,
    STG_PRODUCT_MARKUP.V_PROD_CODE,
    STG_PRODUCT_MARKUP.N_PROD_MARKUP_PER,
    $RUNSK
from dev_aai80ipe.STG_PRODUCT_MARKUP
    INNER JOIN dev_aai80ipe.DIM_PRODUCT
    ON STG_PRODUCT_MARKUP.v_prod_code =DIM_PRODUCT.v_prod_code
    AND DIM_PRODUCT.f_latest_record_indicator ='Y'
Load data local inpath
    '/scratch/ofsaaweb/ftpshare//UT801_LoadIntoHive_20150131_3_RDBMS_PRODUCT_
MARKUP'
into table FCT_PRODUCT_MARKUP
```

What is claimed is:

1. A computer implemented method comprising:

maintaining a mapping indicating that a first plurality of data objects and a second plurality of data objects are respectively stored in a structured data store and an unstructured data store, wherein said first plurality of data objects and said second plurality of data objects are defined according to an application data model;

receiving an application object of an application process, said application object specifying a first operation based on a first data object according to said application data model;

examining said mapping to identify a specific data store storing the data corresponding to said first data object, said specific data store being identified as said structured data store if said first data object is contained in said first plurality of data objects and as said unstructured data store if said first data object is contained in said second plurality of data objects;

translating said first operation to a first set of instructions consistent with interface requirements of said specific data store; and executing said first set of instructions on said specific data store to cause said operation to be performed based on said first data object stored in said specific data store, wherein said operation is performed in said structured data store if said examining indicates that said first data object is contained in said first plurality of data objects and in said unstructured data store if said examining indicates that said first data object is contained in said second plurality of data objects, wherein said maintaining, said receiving, said examining, said translating and said executing are performed in a server system external to said structured data store and said unstructured data store.

2. The computer implemented method of claim 1, wherein said first data object is contained in said first plurality of data objects such that said first set of instructions are consistent with interface requirements of said structured data store and which, upon said executing, cause said operation to be performed in said structured data store, wherein said application object is defined to contain a plurality of operations including said first operation and a second operation, said application object specifying that said second operation is based on a second data object, wherein said second data object is specified in said mapping to be contained in said second plurality of data objects, wherein said translating translates said second operation to a second set of instructions consistent with interface requirements of said unstructured data store and which, upon said executing, causes said second operation to be performed in said unstructured data store.

3. The computer implemented method of claim 2, wherein said first operation comprises retrieving instances of said first data object, wherein said second operation comprises updating instances of said second data object based on the retrieved instances of said first data object.

4. The computer implemented method of claim 1, further comprising:

receiving a command to move a first data portion representing said first data object in one data store to the other data store, wherein said one data store is one of said structured data store and said unstructured data store;

moving said first data portion from said one data store to said other data store according to said command; and modifying said mapping to generate a new mapping reflecting said moving.

5. The computer implemented method of claim 4, wherein said one data store is said structured data store and said other data store is said unstructured data store, wherein said moving moves said first data portion from said structured data store to said unstructured data store.

6. The computer implemented method of claim 4, wherein said application object is received at a first time instance prior to receiving of said command, said method further comprising receiving a second application object specifying said first operation based on said first data object at a second time instance after said modifying, wherein said examining identifies said structured data store as said specific data store for said application object based on said mapping, and identifies said unstructured data store as said specific data store for said second application object based on said new mapping, wherein said first set of instructions are consistent with interface requirements of said structured data store for said application object, and said first set of instructions are consistent with interface requirements of said unstructured data store for said second application object.

7. The computer implemented method of claim 6, wherein said structured data store is a relational database management system (RDBMS) providing access to data based on SQL (structured query language) queries and said unstructured data store is a Hadoop distributed file system (DFS) providing access to data based on Hive Query Language (Hive QL) queries.

8. A non-transitory machine readable medium storing one or more sequences of instructions for enabling a system to facilitate application processes defined using application objects to operate based on structured and unstructured data stores, wherein execution of said one or more instructions by one or more processors contained in said system enables said system to perform the actions of:

maintaining a mapping indicating that a first plurality of data objects and a second plurality of data objects are respectively stored in a structured data store and an unstructured data store, wherein said first plurality of data objects and said second plurality of data objects are defined according to an application data model;

receiving an application object of an application process, said application object specifying a first operation based on a first data object according to said application data model;

examining said mapping to identify a specific data store storing the data corresponding to said first data object, said specific data store being identified as said structured data store if said first data object is contained in said first plurality of data objects and as said unstructured data store if said first data object is contained in said second plurality of data objects;

translating said first operation to a first set of instructions consistent with interface requirements of said specific data store; and executing said first set of instructions on said specific data store to cause said operation to be performed based on said first data object stored in said specific data store, wherein said operation is performed in said structured data store if said examining indicates that said first data object is contained in said first plurality of data objects and in said unstructured data store if said examining indicates that said first data object is contained in said second plurality of data objects.

9. The non-transitory machine readable medium of claim 8, wherein said first data object is contained in said first plurality of data objects such that said first set of instructions are consistent with interface requirements of said structured data store and which, upon said executing, cause said operation to be performed in said structured data store, wherein said application object is defined to contain a plurality of operations including said first operation and a second operation, said application object specifying that said second operation is based on a second data object, wherein said second data object is specified in said mapping to be contained in said second plurality of data objects, wherein said translating translates said second operation to a second set of instructions consistent with interface requirements of said unstructured data store and which, upon said executing, causes said second operation to be performed in said unstructured data store.

10. The non-transitory machine readable medium of claim 9, wherein said first operation comprises retrieving instances of said first data object, wherein said second operation comprises updating instances of said second data object based on the retrieved instances of said first data object.

11. The non-transitory machine readable medium of claim 8, further comprising one or more instructions for:
receiving a command to move a first data portion representing said first data object in one data store to the other data store, wherein said one data store is one of said structured data store and said unstructured data store;
moving said first data portion from said one data store to said other data store according to said command; and
modifying said mapping to generate a new mapping reflecting said moving.

12. The non-transitory machine readable medium of claim 11, wherein said one data store is said structured data store and said other data store is said unstructured data store, wherein said moving moves said first data portion from said structured data store to said unstructured data store.

13. The non-transitory machine readable medium of claim 11, wherein said application object is received at a first time instance prior to receiving of said command, said method further comprising receiving a second application object specifying said first operation based on said first data object at a second time instance after said modifying,
wherein said examining identifies said structured data store as said specific data store for said application object based on said mapping, and identifies said unstructured data store as said specific data store for said second application object based on said new mapping,
wherein said first set of instructions are consistent with interface requirements of said structured data store for said application object, and said first set of instructions are consistent with interface requirements of said unstructured data store for said second application object.

14. The non-transitory machine readable medium of claim 13, wherein said structured data store is a relational database management system (RDBMS) providing access to data based on SQL (structured query language) queries and said unstructured data store is a Hadoop distributed file system (DFS) providing access to data based on Hive Query Language (Hive QL) queries.

15. A digital processing system comprising:
a processor;
a random access memory (RAM);
a non-transitory machine readable medium to store one or more instructions, which when retrieved into said RAM and executed by said processor causes said digital processing system to perform the actions of:
maintaining a mapping indicating that a first plurality of data objects and a second plurality of data objects are respectively stored in a structured data store and an unstructured data store, wherein said first plurality of data objects and said second plurality of data objects are defined according to an application data model;
receiving an application object of an application process, said application object specifying a first operation based on a first data object according to said application data model;
examining said mapping to identify a specific data store storing the data corresponding to said first data object, said specific data store being identified as said structured data store if said first data object is contained in said first plurality of data objects and as said unstructured data store if said first data object is contained in said second plurality of data objects;
translating said first operation to a first set of instructions consistent with interface requirements of said specific data store; and
executing said first set of instructions on said specific data store to cause said operation to be performed based on said first data object stored in said specific data store,
wherein said operation is performed in said structured data store if said examining indicates that said first data object is contained in said first plurality of data objects and in said unstructured data store if said examining indicates that said first data object is contained in said second plurality of data objects.

16. The digital processing system of claim 15, wherein said first data object is contained in said first plurality of data objects such that said first set of instructions are consistent with interface requirements of said structured data store and which, upon said executing, cause said operation to be performed in said structured data store,
wherein said application object is defined to contain a plurality of operations including said first operation and a second operation, said application object specifying that said second operation is based on a second data object, wherein said second data object is specified in said mapping to be contained in said second plurality of data objects,
wherein said translating translates said second operation to a second set of instructions consistent with interface requirements of said unstructured data store and which, upon said executing, causes said second operation to be performed in said unstructured data store.

17. The digital processing system of claim 16, wherein said first operation comprises retrieving instances of said first data object, wherein said second operation comprises updating instances of said second data object based on the retrieved instances of said first data object.

18. The digital processing system of claim 15, further performing the actions of:
receiving a command to move a first data portion representing said first data object in one data store to the other data store, wherein said one data store is one of said structured data store and said unstructured data store;
moving said first data portion from said one data store to said other data store according to said command; and
modifying said mapping to generate a new mapping reflecting said moving.

19. The digital processing system of claim 18, wherein said one data store is said structured data store and said other data store is said unstructured data store, wherein said moving moves said first data portion from said structured data store to said unstructured data store.

20. The digital processing system of claim 18, wherein said application object is received at a first time instance prior to receiving of said command, said method further comprising receiving a second application object specifying said first operation based on said first data object at a second time instance after said modifying,
wherein said examining identifies said structured data store as said specific data store for said application object based on said mapping, and identifies said unstructured data store as said specific data store for said second application object based on said new mapping,
wherein said first set of instructions are consistent with interface requirements of said structured data store for said application object, and said first set of instructions are consistent with interface requirements of said unstructured data store for said second application object.

\* \* \* \* \*